(12) United States Patent
Takahashi

(10) Patent No.: US 10,525,384 B2
(45) Date of Patent: Jan. 7, 2020

(54) FILTER ELEMENT AND FILTERING APPARATUS

(71) Applicant: FUJI FILTER MANUFACTURING CO., LTD., Tokyo (JP)

(72) Inventor: Yuichi Takahashi, Utsunomiya (JP)

(73) Assignee: Fuji Filter Manufacturing Co., Ltd., Tokyo (JP)

( * ) Notice: Subject to any disclaimer, the term of this patent is extended or adjusted under 35 U.S.C. 154(b) by 337 days.

(21) Appl. No.: 15/112,144

(22) PCT Filed: Jan. 15, 2014

(86) PCT No.: PCT/JP2014/050508
§ 371 (c)(1),
(2) Date: Jul. 15, 2016

(87) PCT Pub. No.: WO2015/107624
PCT Pub. Date: Jul. 23, 2015

(65) Prior Publication Data
US 2016/0339369 A1 Nov. 24, 2016

(51) Int. Cl.
*B01D 29/66* (2006.01)
*B01D 29/64* (2006.01)
(Continued)

(52) U.S. Cl.
CPC .......... *B01D 29/668* (2013.01); *B01D 29/117* (2013.01); *B01D 29/52* (2013.01); *B01D 29/6423* (2013.01); *B01D 29/6484* (2013.01)

(58) Field of Classification Search
CPC .............. B01D 29/668; B01D 29/6484; B01D 29/117; B01D 29/52; B01D 29/642
See application file for complete search history.

(56) References Cited

U.S. PATENT DOCUMENTS

| 3,623,607 | A | | 11/1971 | Loos | |
|---|---|---|---|---|---|
| 3,850,802 | A | * | 11/1974 | Berger | ................. B01D 29/118 210/106 |

(Continued)

FOREIGN PATENT DOCUMENTS

| CN | 103357881 A | * | 10/2013 | ................ B22F 3/11 |
|---|---|---|---|---|
| JP | S49-17566 A | | 2/1974 | |

(Continued)

OTHER PUBLICATIONS

Takahashi (JP 2013-091046; (machine translation and original attached) (Year: 2013).*

(Continued)

*Primary Examiner* — Liam Royce
(74) *Attorney, Agent, or Firm* — Morgan, Lewis & Bockius LLP

(57) ABSTRACT

The present invention provides a tubular filter element 3 configured to filter fluid by allowing the fluid to pass therethrough from the inside to the outside, and to be backwashed by allowing the fluid to pass therethrough from the outside to the inside. The filter element 3 includes: a tubular filter member 31; first and second end members 32 and 33 having openings and respectively provided at first and second ends of the filter member 31; and a trapped object remover 34 provided in the interior of the filter member 31, and movable by the fluid flow while its outer periphery slides in contact with the inner periphery of the filter member 31 to remove trapped objects. A flow rate restricting means for restricting the fluid flow rate through the second end member 33 is provided on the second end side of the filter member 31.

10 Claims, 16 Drawing Sheets

(51) Int. Cl.
    *B01D 29/11*         (2006.01)
    *B01D 29/52*         (2006.01)

(56) References Cited

U.S. PATENT DOCUMENTS

| | | | |
|---|---|---|---|
| 2002/0092805 A1 | 7/2002 | Koivula | |
| 2008/0282905 A1* | 11/2008 | Savage | A47J 37/1223 |
| | | | 99/408 |
| 2009/0159524 A1 | 6/2009 | Kaske | |
| 2015/0352469 A1* | 12/2015 | Wang | B22F 3/11 |
| | | | 29/460 |

FOREIGN PATENT DOCUMENTS

| | | |
|---|---|---|
| JP | S61-146312 A | 7/1986 |
| JP | S63-185411 U | 11/1988 |
| JP | 02-307503 A | 12/1990 |
| JP | 11-057335 A | 3/1999 |
| JP | 3090022 U | 11/2002 |
| JP | 2003-509200 A | 3/2003 |
| JP | 2010-501323 A | 1/2010 |
| JP | 2013-091046 A | 5/2013 |

OTHER PUBLICATIONS

Wang (CN-103357881); (machine translation and original attached) (Year: 2013).*
International Preliminary Report on Patentability dated Jul. 28, 2016, which issued in International Application No. PCT/JP2014/050508, and English language translation thereof.
Chinese Office Action from Chinese Patent Application No. 201480073230.9, dated May 15, 2017.

\* cited by examiner

FILTER ELEMENT AND FILTERING APPARATUS

TECHNICAL FIELD

The present invention relates to a filtering apparatus that includes tubular filter elements for inside-to-outside filtration each having openings at opposite ends in its longitudinal direction, and that can be backwashed by causing fluid to flow through the filter elements in the reverse directions of those for filtration so as to remove objects trapped and adhered to the filter elements. Specifically, the present invention relates to a filter element that filters fluid and is backwashable by fluid supplied thereto from the opposite end openings of the filter element while removing trapped objects by a trapped object remover which is provided in the filter element and reliably movable in its axial direction by the fluid flow in the axial direction generated during filtration or backwashing, and a filtering apparatus using such filter elements.

BACKGROUND ART

Conventionally, various filtering apparatuses are used for filtering water such as seawater, lake water, river water, drinking water or sewage water, for filtering liquids widely used in industries such as cooling water or process liquids for any of various apparatuses, and for filtering ingredient gases or the like used in chemical factories or the like, so as to trap and remove substances such as microparticles and dust included in such fluid to be filtered.

When the filtering apparatus performs filtration for long periods, solid and/or gel-like substances such as dust trapped by the filter elements are accumulated in the filter elements. This increases the resistance of the filter media for the fluid to pass through, and eventually makes the filtering apparatus hardly capable of filtering the fluid. To address this problem, the filtering performance of the filter elements is restored by, for example, periodically performing an operation called "backwashing," which is a process of causing fluid to flow through the filter elements in the reverse directions of those for filtration so as to release objects trapped and adhered to the filter elements.

This backwashing operation is effective but sometimes fails to completely remove the objects that are trapped and adhered to the filter elements, so that some objects might be left trapped in the filter elements after backwashing. Accordingly, even repeating of the backwashing operation might not prevent an increase in the resistance of the filter media to the fluid flow, which eventually makes the filtering apparatus hardly capable of filtering the fluid. In particular, when gel-like substances such as dust and/or dust coated with highly adhesive materials are strongly stuck on the surfaces of the filter elements, as in the case of filtering the industrial liquid, it is difficult to restore the filtering performance of the filter elements only by simple backwashing of causing fluid to flow through the filter elements in the reverse directions of those for filtration. This is especially true in a filtering apparatus including filter elements of a mesh size less than 200 μm.

Much the same is true for filtration performed under the condition where substances such as fibrous dust are entangled in the filter elements. Such a filtration condition is very likely to occur especially when the fluid to be filtered includes microorganisms, as in filtering water such as seawater, lake water, river water, drinking water or sewage water. For example, when filtering ballast water (seawater) in a vessel's ballast tank, the filtering apparatus traps therein a lot of algae included in the seawater. As a result, fibrous substances including fibrous algae and/or cellulose substances are entangled in the filter elements and cannot be easily removed therefrom.

To address the above, a filtering apparatus capable of restoring the filtering performance of the filter elements has been proposed. An example of the filtering apparatuses of this type includes an inlet channel for the flow to be filtered, an outlet channel for the filtered flow, a number of parallel filtering elements and at least one washing mechanism. The filtering elements are open from both ends, into which the flow to be filtered may be directed so that the infiltration occurs through the element out of the element. The washing mechanism connects alternately to the different ends of the elements at both ends of the filtering elements, and forms a discharge channel for the backflushing of the elements generated with the pressure of the filtered flow. Each of the filtering elements is divided in two between its ends so that the washing mechanism connected to the end of the element generates backflushing only for a part of the element length at a time (see Patent Document 1, for example).

To address the above problems, the present inventors have also proposed a filtering apparatus, which includes, in the interior of the filter element, a trapped object remover configured to be movable in the axial direction of the filter element by the fluid flow generated during filtration or backwashing while its outer peripheral member slides in contact with the inner periphery of the filter element so as to remove trapped objects (See Patent Document 2).

REFERENCE DOCUMENT LIST

Patent Documents

Patent Document 1: JP 2003-509200 A
Patent Document 2: JP 2013-91046 A

SUMMARY OF THE INVENTION

Problems to be Solved by the Invention

The filtering apparatus disclosed in Patent Document 1 performs backwashing for releasing objects trapped and adhered to the filter elements, from opposite end openings of each of the filter elements, at different timings. However, these filtering apparatuses perform backwashing simply by using the pressure of the fluid flow. It is, however, difficult to restore the filtering performance of the filter elements only by backwashing simply using the pressure of the fluid flow, when fibrous substances such as dust are entangled in the filter elements, or when such entangled fibrous substances are coated with highly sticky or adhesive materials.

On the other hand, the filtering apparatus disclosed in Patent Document 2 includes the trapped object remover configured to be movable in the filter element in its axial direction by the fluid flow generated during filtration or backwashing while its outer peripheral member slides in contact with the inner periphery of the filter element so as to remove trapped objects. However, since the filter element has a closed end opposite to its inlet end, the axial flow rate near the closed end tends to be insufficient, and this axial flow might be unable to move the trapped object remover to the closed end.

Moreover, Patent Documents 1 and 2 disclose a backwashing method of backwashing the filter elements by connecting a backwashing pipe to the filter elements. In the filtering apparatus using this backwashing method, the backwashing pipe remains connected to one or more of the filter elements even while the filtering apparatus performs filtration. This prevents unfiltered fluid from being supplied into the filter elements that are connected to the backwashing pipe, thus prevents these filter elements from filtering the fluid.

To address the above problems, the present invention provides a filter element that filters fluid and is backwashable by fluid supplied thereto from opposite end openings of the filter element while removing the trapped objects by a trapped object remover which is provided in the filter element and reliably movable in its axial direction by the fluid flow in the axial direction generated during filtration or backwashing, and a filtering apparatus using such filter elements.

Means for Solving the Problems

To solve the above problems, a filter element according to the present invention that has a tubular shape with openings at opposite ends in a longitudinal direction thereof, and that is configured to filter fluid by allowing the fluid to pass through the filter element from the inside to the outside, and to be backwashed by allowing the fluid to pass through the filter element from the outside to the inside includes a filter member, a first end member, a second end member and a trapped object remover. The filter member extends in a predetermined length and has openings at opposite ends. The first end member is coupled to a first end of the filter member so as to support the filter member, and has an opening that allows the fluid to flow therethrough. The second end member is coupled to a second end of the filter member so as to support the filter member, and has an opening that allows the fluid to flow therethrough. The trapped object remover is provided in an interior of the filter member, and configured to be movable in the interior of the filter member between the first and second end members by a flow of the fluid in an axial direction of the filter member generated during filtration or backwashing, while an outer periphery of the trapped object remover slides in contact with an inner periphery of the filter member so as to remove an object trapped by the filter member. At the second end of the filter member, a flow rate restricting means for restricting a flow rate of the fluid through the second end member is provided.

A filtering apparatus according to the present invention includes a casing, a first partition wall, filter elements, a second partition wall, a backwashing pipe and a backwashing fluid drain pipe. The casing has a fluid inlet that allows fluid to flow in from an outside of the casing, and a fluid outlet that allows the fluid filtered in the filtering apparatus to flow to the outside. The first partition wall separates an interior of the casing into an unfiltered fluid chamber filled with unfiltered fluid and communicating with the fluid inlet and a filtered fluid chamber filled with a filtered fluid and communicating with the fluid outlet. The filter elements are each formed into a tubular shape, and provided in parallel to each other in the filtered fluid chamber with first ends fitted and held by through holes formed in the first partition wall and with internal spaces of the filter elements communicating with the unfiltered fluid chamber. Each of the filter elements is configured to filter the fluid by allowing the fluid to pass through the filter element from the inside to the outside, and to be backwashed by allowing the fluid to pass through the filter element from the outside to the inside. The second partition wall is provided in parallel to the first partition wall so as to be located on a second end side of the filter elements and has multiple through holes each for fitting and holding the second end of the corresponding one of the filter elements thus to isolate a portion of the filtered fluid chamber on the second end side of the filter elements from the rest of the fluid chamber to define a communication chamber through which the fluid can flow between the filter elements. The backwashing pipe is connected to the first ends of one or more of the filter elements to backwash the filter elements by allowing the fluid to pass through the filter elements from the outside to the inside. The backwashing fluid drain pipe that is coupled to a discharge side of the backwashing pipes and discharges, to the outside of the casing, a trapped object removed by backwashing the filter elements. Each of the filter elements is the aforementioned filter element according to the present invention, and is disposed so that the first and second end members are located on the first and second end sides of the filter element, respectively.

The filtering apparatus according to the present invention includes a casing, a first partition wall, filter elements, a communication pipe, a backwashing pipe and a backwashing fluid drain pipe. The casing has a fluid inlet that allows fluid to flow in from an outside of the casing, and a fluid outlet that allows the fluid filtered in the filtering apparatus to flow to the outside. The first partition wall separates an interior of the casing into an unfiltered fluid chamber filled with unfiltered fluid and communicating with the fluid inlet and a filtered fluid chamber filled with a filtered fluid and communicating with the fluid outlet. The filter elements are each formed into a tubular shape, and provided in parallel to each other in the filtered fluid chamber with first ends fitted and held by through holes formed in the first partition wall and with internal spaces of the filter elements communicating with the unfiltered fluid chamber. Each of the filter elements is configured to filter the fluid by allowing the fluid to pass through the filter element from the inside to the outside, and to be backwashed by allowing the fluid to pass through the filter element from the outside to the inside. The communication pipe is connected to second ends of the filter elements so that the second ends communicate with one another while isolated from the filtered fluid chamber. The backwashing pipe is connected to the first ends of one or more of the filter elements to backwash the filter elements by allowing the fluid to pass through the filter elements from the outside to the inside. The backwashing fluid drain pipe that is coupled to a discharge side of the backwashing pipe and discharges, to the outside of the casing, a trapped object removed by backwashing the filter elements. Each of the filter elements is the aforementioned filter element according to the present invention, and is disposed so that the first and second end members are located on the first and second end sides of the filter element, respectively.

Effects of the Invention

The filter element according to the present invention includes a filter member, a first end member having an opening and coupled to a first end of the filter member, a second end member having an opening and coupled to a second end of the filter member and a trapped object remover provided in the interior of the filter member. Here, a flow rate restricting means is provided at the second end of the filter member. Accordingly, the filter element is capable of restricting the fluid flow rate through the second end member. This allows the fluid to flow through the second end member at an appropriate rate, and thus enables the trapped object remover in the filter element to reliably move to an abutment position on the second end member side. When the filter element is used in the filtering apparatus according to the present invention, the trapped object remover can be moved in the interior of the filter member between the first and second end members by a flow of the fluid in an axial direction of the filter member generated during filtration or backwashing so as to reliably remove an object trapped by the filter member.

A filtering apparatus according to the present invention includes a casing, a first partition wall that separates the interior of the casing into an unfiltered fluid chamber and a filtered fluid chamber, filter elements provided in parallel to each other in the filtered fluid chamber with first ends communicating with the unfiltered fluid chamber, a second partition wall that isolates a portion of the filtered fluid chamber from the rest thereof to define a communication chamber with which second ends of the filter elements communicate, a backwashing pipe connected to one or more of the filter elements to backwash the filter elements, and a backwashing fluid drain pipe that discharges, to the outside, a trapped object removed by backwashing. Here, each of the filter elements is the aforementioned filter element according to the present invention. Accordingly, the filtering apparatus can allow the fluid to flow through the second ends while restricting the fluid flow rate through the second ends of the filter elements to an appropriate rate. This enables the trapped object removers in the filter elements to reliably move to the second ends. Thus, the filtering apparatus allows each of the trapped object removers in the filter elements to be moved in the interior of the corresponding filter member between the first and second ends by the fluid flow in an axial direction of the filter member generated during filtration or backwashing so as to reliably remove objects trapped by the filter member, and can discharge the trapped and removed objects through the backwashing pipe and the backwashing fluid drain pipe. Thereby, the filtering apparatus can provide an improved backwashing effect. Moreover, during the filtering operation, since the fluid can flow also through the communication chamber into the filter element whose first end is connected to the backwashing pipe, filtration can be performed also in such a filter element, which means that the usage efficiency of the filter elements can be improved. Furthermore, the backwashing pipe has to be provided only at the first ends of the filter elements. This allows the filtering apparatus to have a simpler structure than the filtering apparatus provided with two backwashing pipes on opposite ends of the filter elements, and thus to be manufactured at lower cost.

Another filtering apparatus according to the present invention includes a casing, a first partition wall that separates the interior of the casing into an unfiltered fluid chamber and a filtered fluid chamber, filter elements provided in parallel to each other in the filtered fluid chamber with first ends communicating with the unfiltered fluid chamber, a communication pipe connected to second ends of the filter elements so that the second ends communicate with one another while isolated from the filtered fluid chamber, a backwashing pipe connected to one or more of the filter elements so as to backwash the filter elements, and a backwashing fluid drain pipe for discharging, to the outside, a trapped object removed by backwashing. Here, each of the filter elements is the aforementioned filter element according to the present invention. Accordingly, the filtering apparatus can allow the fluid to flow through the second ends of the filter elements while restricting the fluid flow rate through the second ends to an appropriate rate. This enables the trapped object removers in the filter elements to reliably move to the second ends. Thus, the filtering apparatus allows each of the trapped object removers in the filter elements to be moved in the interior of the corresponding filter member between the first and second ends while the filter member is being backwashed so as to reliably remove objects trapped by the filter member, and can discharge the trapped and removed objects through the backwashing pipe and the backwashing fluid drain pipe. Thereby, the filtering apparatus can provide an improved backwashing effect. Moreover, during the filtering operation, since the fluid can flow through the communication pipe also into the filter element whose first end is connected to the backwashing pipe, filtration can be performed also in such a filter element, which means that the usage efficiency of the filter elements can be improved. Furthermore, the backwashing pipe has to be provided only at the first ends of the filter elements. This allows the filtering apparatus to have a simpler structure than the filtering apparatus provided with two backwashing pipes on opposite ends of the filter elements, and thus to be manufactured at lower cost.

MODES FOR CARRYING OUT THE INVENTION

Hereinafter, embodiments according to the present invention will be described with reference to the attached drawings.

Figure 1:
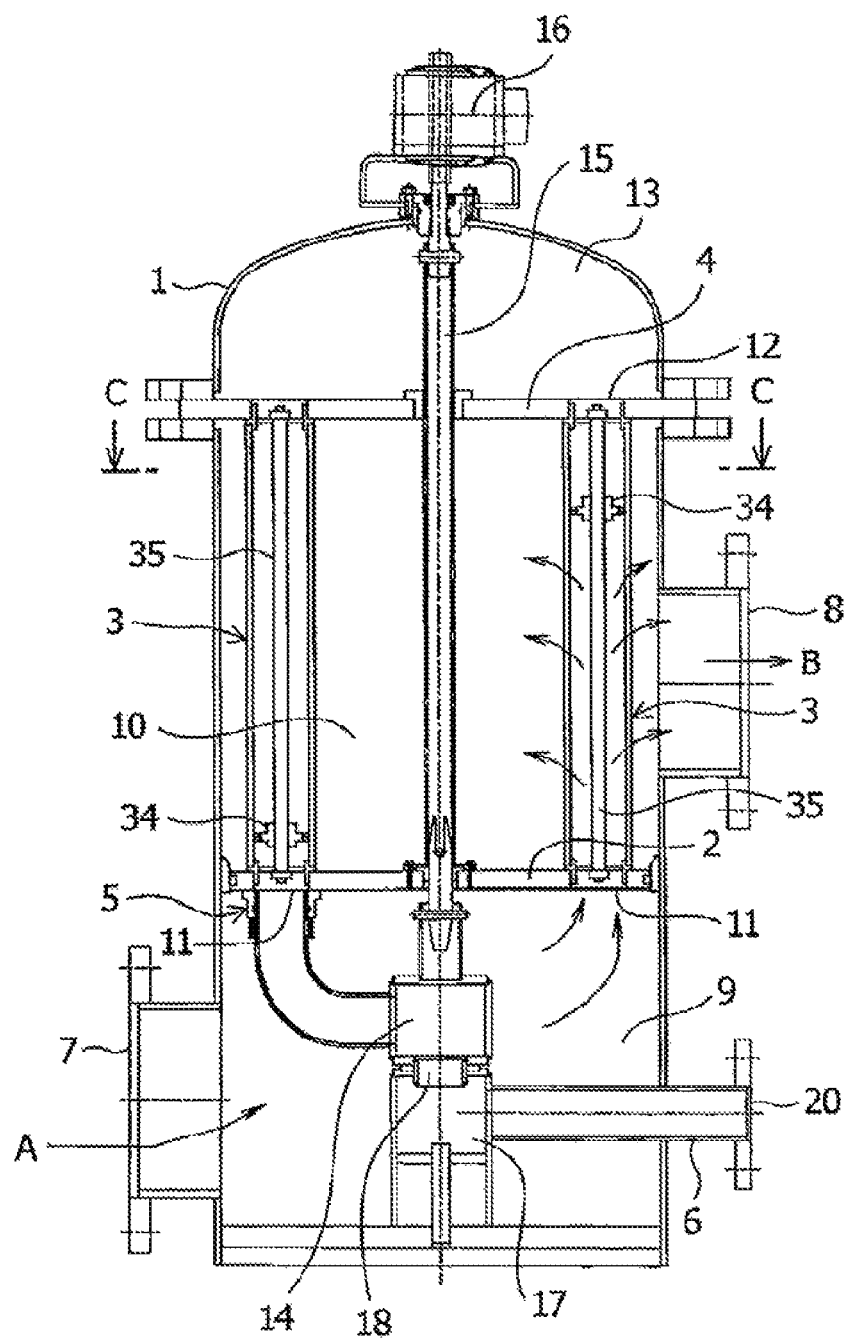
FIG. 1 is a front cross-sectional view of a first embodiment of the filtering apparatus according to the present invention.
Figure 2:
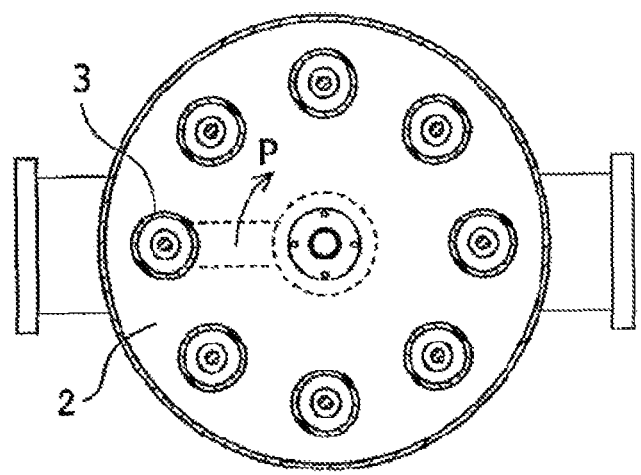
FIG. 2 is a cross-sectional view taken along C-C line of FIG. 1.

FIG. 1 is a front cross-sectional view of a first embodiment of the filtering apparatus according to the present invention. FIG. 2 is a cross-sectional view taken along C-C line of FIG. 1. The filtering apparatus is used for filtering water such as seawater (ballast water within a vessel, for example), lake water, river water, drinking water or sewage water, for filtering liquids widely used in industries such as cooling water or process liquids for any of various apparatuses, and also for filtering ingredient gases or the like used in chemical factories or the like. The filtering apparatus traps and removes substances such as microparticles and dust included in such fluid to be filtered. The filtering apparatus includes a casing 1, a first partition wall 2, filter elements 3, a second partition wall 4, a backwashing pipe 5 and a backwashing fluid drain pipe 6, as shown in FIG. 1.

The casing 1 is an outer shell of the filtering apparatus, and formed in a shape such as a tubular shape (cylindrical shape, for example) with a top lid and a closed bottom, or a rectangular parallelepiped shape. The casing 1 has a fluid inlet 7 at the lower end portion of the sidewall of the casing 1, and a fluid outlet 8 in an upper portion of the sidewall, for example. The fluid inlet 6 allows fluid to flow in from the outside as indicated by arrow A. The fluid outlet 8 allows the fluid filtered in the filtering apparatus to flow to the outside as indicated by arrow B. The casing 1 is formed of a material such as a metal or a synthetic resin, and may have any shape and size appropriately determined in accordance with conditions such as the intended use of the filtering apparatus, the type and volume of liquid, gas or the like to be filtered, and the installation site.

The first partition wall 2 is horizontally provided at a lower position in the casing 1. The first partition wall 2 separates the interior of the casing 1 into an unfiltered fluid chamber 9 and a filtered fluid chamber 10. The unfiltered fluid chamber 9 is filled with unfiltered fluid, and communicates with the fluid inlet 7. The filtered fluid chamber 10 is filled with a filtered fluid and communicates with the fluid outlet 8. In the first partition wall 2, formed are multiple through holes 11 each for fitting and holding a first end (lower end) of the corresponding filter element 3.

The multiple filter elements 3 are provided vertically in parallel to each other on the upper side of the first partition wall 2 in the filtered fluid chamber 10. The lower end of each of the filter elements 3 is fitted and held by the corresponding through hole 11 with the inside of the filter element 3 communicating with the unfiltered fluid chamber 9. Each filter element 3 is formed in a tubular shape such as a cylindrical shape, which allows fluid to be filtered to pass therethrough from the inside to the outside so as to trap and filter out solid and/or gel-like substances such as dust included in the fluid, and which is backwashed by allowing the fluid to pass therethrough from the outside to the inside. FIG. 2 shows an example in which eight filter elements 3 are arranged on a single circle. However, the number of the filter elements 3 is not limited to eight, but may be any plural number. Moreover, the filter elements 3 may be arranged on two or more concentric circles.

The second partition wall 4 is horizontally provided in parallel to the first partition wall 2 so as to be located on the second end (upper end) side of the filter elements 3. The second partition wall 4 isolates an upper portion of the filtered fluid chamber 10 from the rest thereof to define a communication chamber 13. Through the communication chamber 13, the fluid can flow between the filter elements 3. The second partition wall 4 has multiple through holes 12 each for fitting and holding the second end (upper end) of the corresponding filter element 3.

The communication chamber 13 is formed between the upper lid of the casing 1 and the second partition wall 4. The communication chamber 13, through which the filter elements 3 communicate with each other at the upper ends, allows the fluid to flow between the filter elements 3. The communication chamber 13 is isolated from the unfiltered fluid chamber 9, the filtered fluid chamber 10 and the backwashing pipe 5. The communication chamber 13 need not have a particularly large capacity, but need only to have a capacity large enough to allow the fluid to smoothly flow therethrough.

The backwashing pipe 5 is disposed under the first partition wall 2. The backwashing pipe 5 has a base end portion 14 and radially extends therefrom to the left in FIG. 1 so as to be connected to any one of the filter elements 3 through the corresponding through hole 11 formed in the first partition wall 2. FIG. 1 shows an example in which the filtering apparatus includes a single backwashing pipe 5. However, the filtering apparatus may alternatively include two or more backwashing pipes 5 to connect to two or more filter elements 3 simultaneously.

A shaft 15 is mounted on the base end portion 14 of the backwashing pipe 5. The shaft 15 extends upwardly on the central axis of the base end portion 14 so as to protrude to the outside of the casing 1. A geared motor 16 is provided to the protruding end of the shaft 15 so as to rotationally drive the shaft 15. When rotationally driven, the geared motor 16 rotates the shaft 15 in, for example, the clockwise direction indicated by arrow P, as shown in FIG. 2. The backwashing pipe 5 is sequentially connected to the lower end openings of the multiple filter elements 3 arranged in, for example, a circle.

As shown in FIG. 1, the backwashing fluid drain pipe 6 is coupled to the discharge side of the backwashing pipe 5, that is, the base end portion 14 of the backwashing pipe 5. The backwashing fluid drain pipe 6 is formed in a straight pipe extending in a radial direction of the casing 1. The backwashing fluid drain pipe 6 discharges, to the outside of the casing 1, trapped objects removed while the filter elements 3 are backwashed. To a base end portion 17 of the backwashing fluid drain pipe 6, a coupling port portion 18 is provided so as to open upwardly. The base end portion 14 of the backwashing pipe 5 is rotatably coupled to the coupling port portion 18. A discharge port 20 on the distal end of the backwashing fluid drain pipe 6 protrudes to the outside of the casing 1.

The backwashing fluid drain pipe 6 is fixed to the casing 1. At the connection interface between the coupling port portion 18 of the base end portion 17 and the base end portion 14 of the backwashing pipe 5, a bearing mechanism and a sealing mechanism are provided. The bearing mechanism, such as a bearing, supports the backwashing pipe 5, and the sealing mechanism prevents objects to be discharged from being mixed into the unfiltered fluid. When rotationally driven, the geared motor 16 rotates the backwashing pipe 5 by using the coupling port portion 18 as a rotational support while keeping a seal between the coupling port portion 18 and the base end portion 14 of the backwashing pipe 5.

An unillustrated valve is coupled to the discharge side of the discharge port 20 of the backwashing fluid drain pipe 6. The valve opens or closes the backwashing fluid discharge system including the backwashing pipe 5 and the backwashing fluid drain pipe 6. The valve is opened while the filtering apparatus performs backwashing, and closed while the filtering apparatus performs filtration. The discharge side of the valve is at a pressure lower than that in the fluid outlet 8, such as atmospheric pressure.

Each of the filter elements 3 according to the present invention is configured as below.

Figure 3:
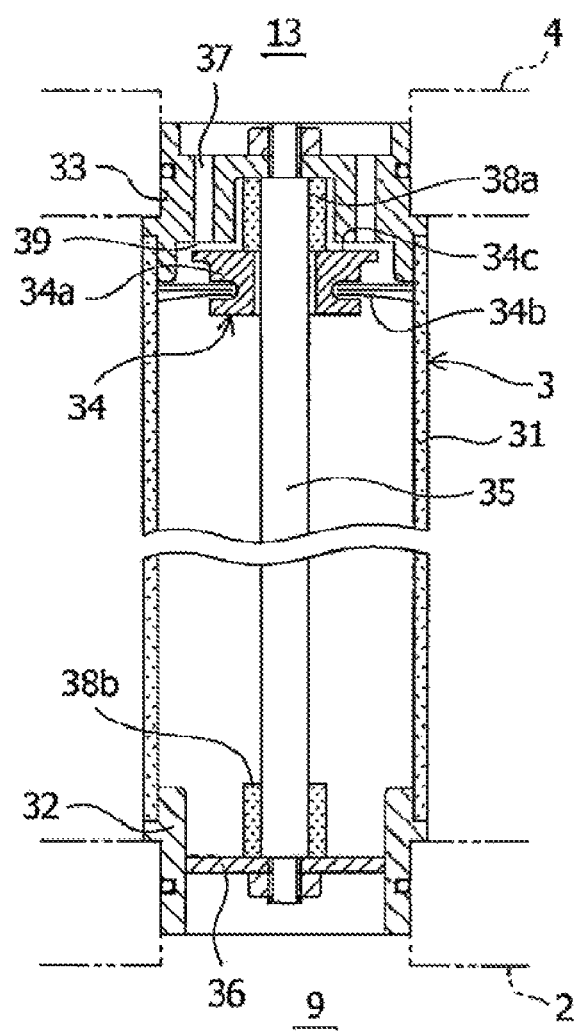
FIG. 3 is a front cross-sectional view of a first embodiment of the filter element according to the present invention.
Figure 4A:
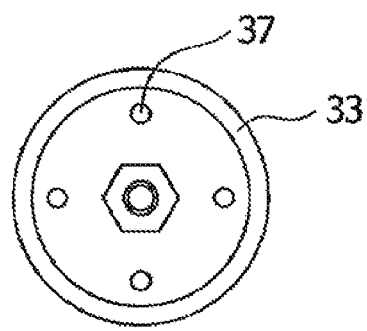
FIGS. 4A and 4B are top and bottom plan views of the filter element shown in FIG. 3, respectively.
Figure 4B:
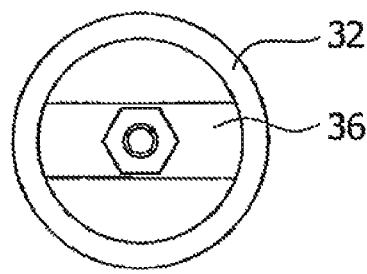

FIGS. 3, 4A and 4B are respectively a front cross-sectional view, a plan view and a bottom view of a first embodiment of the filter element 3 according to the present invention. The filter element 3 is used for filtering the fluid to be filtered. The filter element 3 includes a filter member 31, a first end member 32, a second end member 33 and a trapped object remover 34. In the filtering apparatus according to the present invention, the first end member 32 is disposed at the first end (lower end) of the filter element 3 while the second end member 33 is disposed at the second end (upper end) of the filter element 3.

The filter member 31, that is, a member for filtering the fluid, is formed in a tubular shape such as a cylindrical shape. The filter member 31 may be any one so long as it includes multilayered filter media in which the finest mesh filter medium lies in the innermost layer. Examples of the filter member 31 include a cylindrical sintered mesh filter, a cylindrical notch wire filter and a cylindrical wedge wire filter. The cylindrical sintered mesh filter may be one formed by sintering multiple metal-mesh layers to increase their shape retention capability and then by forming these sintered mesh layers into a cylindrical shape. When the sintered mesh filter is employed, the mesh size of the innermost layer may be appropriately selected from the range of from 10 to 200 µm, and the mesh size of the other outer layers has only to be rougher than that of the inner most layer, and it may be appropriately selected from the range of from 200 to 5000 µm. In this case, the properties of reinforcing mesh and protecting mesh in the layers other than the innermost layer will affect the strength of the filter member 31. Accordingly, the number, the mesh size and the wire diameter of these outer layers are appropriately selected so that the filter member 31 can provide a required strength. The mesh of the filter member 31 may be plain woven, twilled woven, sateen woven, dutch woven, twilled dutch woven and/or the like. As an alternative, the filter member 31 may be formed first by arranging, around metal mesh in the innermost layer, cylindrical perforated tubes with numerous square holes or a reinforcing member including multiple axially extending thin rods arranged side by side, and then by sintering the resultant layers.

For example, when used for filtering ballast seawater, the filter member 31 preferably includes a fine mesh and a rough metal mesh which are joined together. The fine mesh determines the filter rating of the filter member 31. The rough metal mesh provides the filter member 31 with strength against inside-to-outside force generated during filtration and outside-to-inside force generated during backwashing. More preferably, the filter member for filtering ballast seawater should further include a metal mesh of intermediate mesh size between the rough metal mesh and the fine mesh, and be formed by sintering the layers in which the intermediate metal mesh is interposed between the rough metal mesh and the fine mesh. The appropriate mesh size of the fine mesh is 400 to 100 mesh (63.5 to 254 µm), the appropriate mesh size of the intermediate metal mesh is 100 to 20 mesh (254 to 1270 µm) and the appropriate mesh size of the strength-providing metal mesh is 50 to 5 mesh (508 to 5080 µm).

The properties, such as shape and size, of the filter members 31 may be appropriately determined in accordance with conditions such as the intended use and the filtering performance of the filtering apparatus, the size of the casing 1 and the type of the fluid to be filtered. For example, when formed in a cylindrical shape, the filter member 31 may have an outside diameter appropriately selected from the range of from 300 to 1000 µm, and a length appropriately selected from the range of 5000 mm or less.

The first end member 32 is coupled to the first end (lower end) of the filter member 31. The first end member 32 is formed in a cylindrical shape and reinforces the first end opening of the filter member 31, and prevents the corresponding trapped object remover 34 from falling off. The first end member 32 also constitutes an end member at the unfiltered fluid inlet of the filter element 3. In this embodiment, as shown in FIG. 4B, a stay 36 is mounted on the first end member 32 so as to span the circular opening of the first end member 32 and to pass through the center thereof. The stay 36 has a center hole at the center for allowing a guide shaft 35, which will be described later, to be inserted therethrough.

The second end member 33 is coupled to the second end (upper end), which is an end opposite to the first end located at the unfiltered fluid inlet of the filter member 31. The second end member 33 is formed in a cylindrical lid shape with predetermined openings. The second end member 33 reinforces the second end opening of the filter member 31, and prevents the corresponding trapped object remover 34 from falling off. In a plan view, the second end member 33 is a closed circular lid as shown in FIG. 4A, and has a center hole and four openings 37 surrounding the center hole. The center hole allows the guide shaft 35, which will be described later, to be inserted therethrough. The openings 37 constitute the flow rate restricting means which will be described later.

The trapped object remover 34 is provided in the interior of the filter member 31. When an axial fluid flow is generated in any of the filter members 31 during filtration or backwashing, the fluid flow moves the trapped object remover 34 between the first and second end members 32 and 33 in the filter member 31. Thereby, the outer periphery of each trapped object remover 4 slides in contact with the inner periphery of the corresponding filter member 31, and removes trapped objects from the filter member 31. In view of stabilizing the movement of the trapped object remover 34, it is desirable to make the trapped object remover 34 movable in the axial direction of the filter member 31. To achieve this, it is desirable that the trapped object remover 34 have a through hole on its central axis, and that the guide shaft 35, whose opposite ends are fixed to the first and second end members 32 and 33, is inserted through the through hole.

The trapped object remover 34 is a removal brush as shown in FIG. 3, for example.

The removal brush 34 is formed by planting bristles 34b on the outer periphery of a brush main body 34a, and moves up and down in the corresponding filter element 3 along the guide shaft 35 thereof. At the center of the brush main body 34a, formed is a hole through which the guide shaft 35 is inserted. The brush main body 34a is formed in a donut-shaped disk having a predetermined thickness and an outside diameter smaller than the inner diameter of the filter member 31. The bristles 34b are planted in a ring-like pattern on the outer periphery of the brush main body 34a so as to slide with their tips in contact with the inner periphery of the corresponding filter member 31. The bristles 34b have to be long enough at least to allow their tips to come in contact with the inner periphery of the filter member 31 with a certain pressure.

The bristles 34b may be formed of any material widely used as brush bristles, such as natural or synthetic fibers or metal wires such as steel, copper or brass wires. The bristles 34b are flexible enough to be flexed by the pressure of the fluid flow in the filter elements 3. When the bristles 34b are flexed by the fluid pressure, the flex creates a gap between the tips of the bristles 34b and the inner periphery of the filter member 31, and allows the fluid to flow through the gap.

As shown in FIG. 3, stoppers 38a and 38b are mounted on the upper and lower ends of the guide shaft 35 in each of the filter elements 3. The stoppers 38a and 38b stop the movement of the corresponding trapped object remover (removal brush) 34 at the upper and lower ends of the filter element 3 when the trapped object remover 34 moves up and down in the filter element 3 along the guide shaft 35. Each of the stoppers 38a and 38b is preferably formed of an impact absorbing material such as rubber or a spring.

In the present invention, the flow rate restricting means is provided at the second end (upper end) of each of the filter members 31. The flow rate restricting means restricts the flow rate of fluid flowing through the second end member 33. Allowing a certain rate of the fluid flow through the second end member 33 provides the following advantages.

a) At the start of backwashing of the filter element 3, the trapped object remover 34 is allowed to smoothly move away from the abutment position on the second end member 33 side toward the first end member 32.

b) At the end of backwashing of the filter element 3, the trapped object remover 34 is allowed to smoothly move to the abutment position on the second end member 33 side.

c) During filtration, the filter element 3 that is connected to the backwashing pipe 5 and thus not supplied with fluid from the unfiltered fluid chamber 9 is enabled to filter the fluid by allowing the fluid to flow therein through the communication chamber 13.

On the other hand, restricting the flow rate through the second end member 33 provides the following advantage.

d) The decrease in backwashing efficiency due to excessive influx is prevented. If the fluid flew at an excessively high flow rate through the communication chamber 13 into the filter element 3 that was being backwashed, a reverse pressure difference between inside and outside the filter member 31 would be reduced, so that backwashing efficiency would decrease.

The openings 37 formed in the second end member 33 together with the mounting member 34a of the trapped object remover 34 in FIG. 3 constitute the flow rate restricting means according to this embodiment. When moved to stay at the abutment position on the second end member 33 side, the mounting member 34a of the trapped object remover 34 restricts the fluid flow channels through the openings 37. In the example shown in FIG. 3, when located away from the stopper 38a on the second end member 33 side, the trapped object remover 34 does not close the openings 37 with the end face 34c of its mounting member 34a. Thus, the openings 37 allow the fluid to flow therethrough in a rate corresponding to the opening area of the openings 37. On the other hand, when the trapped object remover 34 abuts on the stopper 38a on the second end member 33 side, the end face 34c of the mounting member 34a of the trapped object remover 34 is located close to the openings 37, thus restricting the fluid flow through the second end member 33 to a rate corresponding to the size of a gap 39 between the openings 37 and the end face 34c.

In the above description, while the trapped object remover 34 abuts on the stopper 38a, the fluid flow through the second end member 33 is restricted to a flow rate corresponding to the size of the gap 39 between the openings 37 and the end face 34c of the mounting member 34a located close to the openings 37. However, the first embodiment of the present invention is not limited to this. Alternatively, the end face 34c of the mounting member 34a may seal the openings 37 not completely but with some gaps left in between while the trapped object remover 34 abuts on the stopper 38a. In this case, the fluid flow through the second end member 33 is restricted to a flow rate corresponding to the size of the gaps. Still alternatively, the end face 34c may seal only some of the openings 37 while the trapped object remover 34 abuts on the stopper 38a. In this case, the fluid flow through the second end member 33 is restricted to a flow rate corresponding to the opening area of the unsealed openings 37. The statement in claim 7 "when moved to an abutment position on the second end member side, the mounting member of the trapped object remover restricts a flow channel for the fluid through the opening" encompasses these configurations.

Next, with reference to FIGS. 5 to 10, the operations of the filter elements 3 according to the first embodiment, which is configured as above, will be described.

Figure 5:
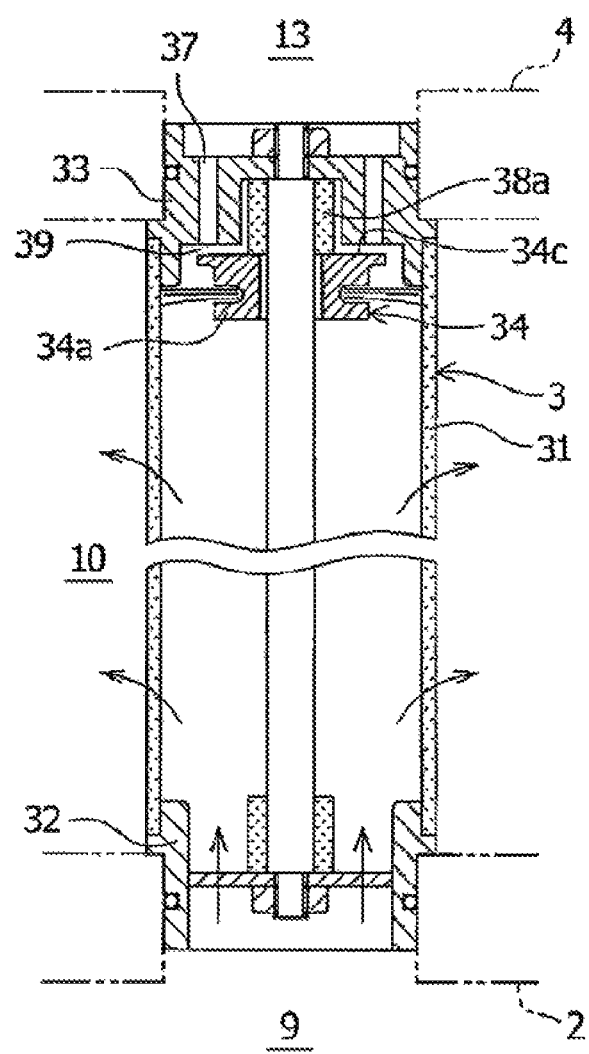
FIG. 5 is a front cross-sectional view of the filter element that is not connected to the backwashing pipe while the filtering apparatus performs filtration.

FIG. 5 is a front cross-sectional view of one of the filter elements 3 that are not connected to the backwashing pipe 5 (see FIG. 1) while the filtering apparatus performs filtration. In this state, the unfiltered fluid flows upwardly into the filter element 3 through the first end member 32, that is, through the lower end. Thereby, the fluid is filtered by passing through the filter member 31 from the inside to the outside to enter the filtered fluid chamber 10. At the same time, this upward unfiltered fluid flow moves the trapped object remover 34 upwardly until the trapped object remover 34 abuts on the stopper 38a on the second end member 33 side. At that time, the end face 34c of the mounting member 34a of the trapped object remover 34 comes close to, but does not abut on, the openings 37 with the narrow gap 39 left in between. The gap 39 communicates with the communication chamber 13 of the filtering apparatus. Since the fluid in the communication chamber 13 flows out into the filter element 3 that is connected to the backwashing pipe 5, the pressure in the communication chamber 13 is lower than that in the filter elements 3 that are filtering the fluid. Accordingly, the fluid in these filter elements 3 that are filtering the fluid partly flows into the communication chamber 13 through the gaps 39.

Figure 6:
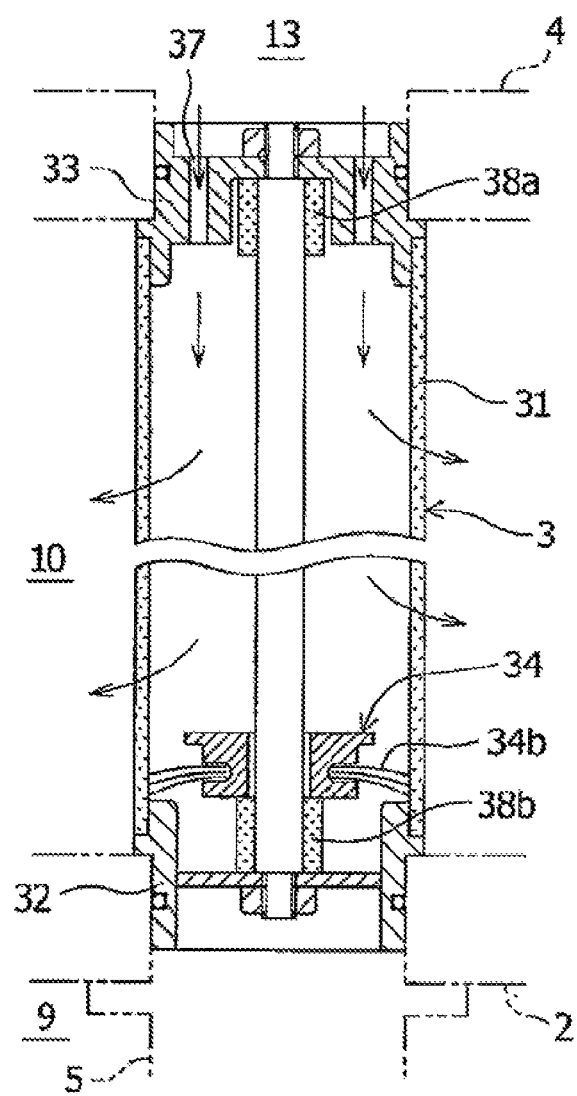
FIG. 6 is a front cross-sectional view of the filter element that is connected to the backwashing pipe while the filtering apparatus performs filtration.

FIG. 6 is a front cross-sectional view of the filter element 3 that is connected to the backwashing pipe 5 while the filtering apparatus performs filtration. During filtration, though the valve for the backwashing fluid discharge system is closed, the fluid in the unfiltered fluid chamber 9 cannot flow into the filter element 3 that is connected to the backwashing pipe 5. However, the fluid in the filter elements 3 that are not connected to the backwashing pipe 5 flows through the communication chamber 13 and the openings 37 of the second end member 33 into the filter element 3 that is connected to the backwashing pipe 5. Accordingly, the pressure in this filter element 3 becomes higher than that in the filtered fluid chamber 10. As a result, the fluid in that filter element 3 passes through its filter member 31 from the inside to the outside to thereby be filtered, and enters the filtered fluid chamber 10. At that time, the downward flow of the flow entering from the communication chamber 13 moves the trapped object remover 34 downwardly until the trapped object remover 34 abuts on the stopper 38b on the first end member 32 side at the lower end of the filter member 31.

Figure 7:
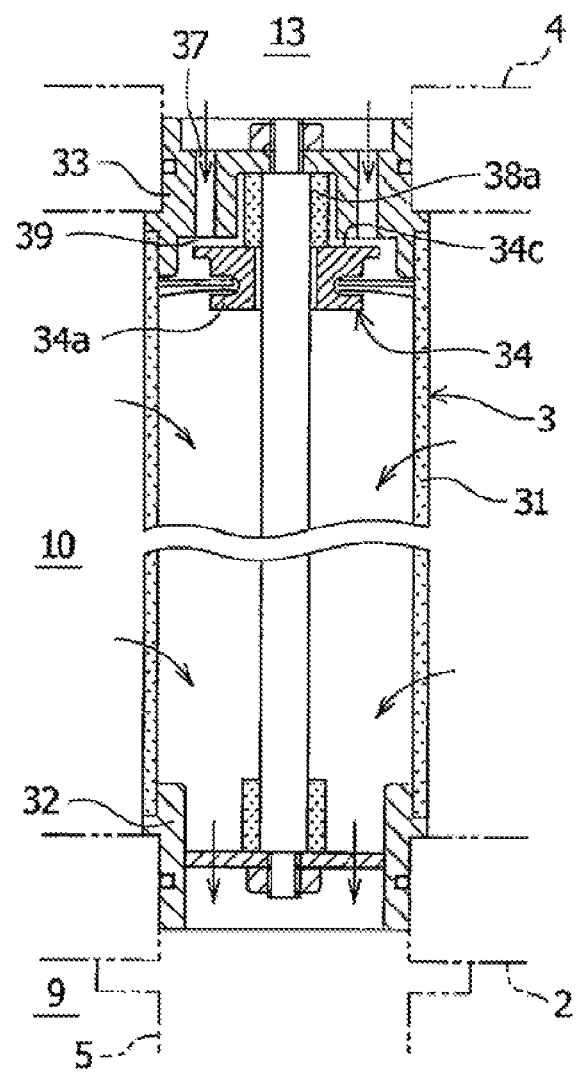
FIG. 7 is a front cross-sectional view of the filter element in FIG. 5 which has just connected to the backwashing pipe and for which backwashing has just started.

FIG. 7 is a front cross-sectional view of the filter element 3 when the filtering apparatus has just started backwashing, and the backwashing pipe 5 has rotated to be just connected to the filter element 3 that has been performing filtration in FIG. 5. The fluid in the filter element 3 flows out through the backwashing pipe 5 and the backwashing fluid drain pipe 6 connected thereto, and is eventually introduced to a region at a pressure lower than that in the filtered fluid chamber 10 (hereinafter the condition will be referred to as "the backwashing pipe 5 sucks out the fluid"). This reduces the pressure in this filter element 3, and thus causes the fluid in the filtered fluid chamber 10 to flow back into the filter element 3 to start backwashing. At that time, the trapped object remover 34 is still at its uppermost position. Thus, the fluid in the filtered fluid chamber 10 hardly passes through to the inside of the filter member 31 in the region above the trapped object remover 34, and is less likely to move the trapped object remover 34 downward. However, the second end member 33 of each of the filter elements 3 according to the present invention has the openings 37, and communicates with the communication chamber 13 through the openings 37. In addition, the communication chamber 13 is supplied with the fluid, though restricted, from all the filter elements 3 (see FIG. 10) not connected to the backwashing pipe 5. Accordingly, the fluid in the communication chamber 13 also flows through the openings 37 into the filter element 3 shown in FIG. 7. This fluid flow makes the pressure in the space above the trapped object remover 34 higher than in the region below the trapped object remover 34, and thus reliably pushes down the trapped object remover 34.

Figure 8:
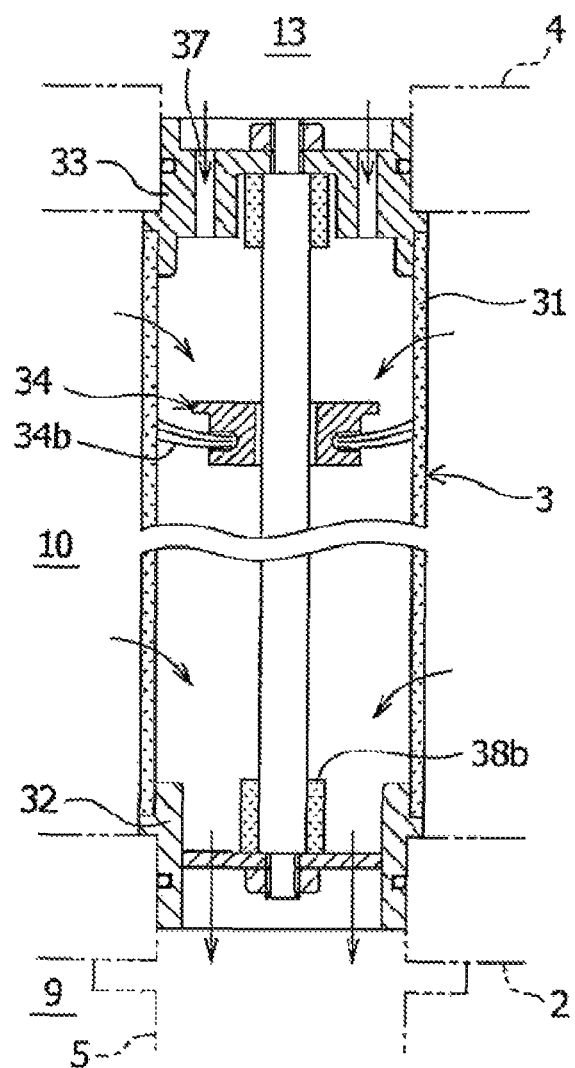
FIG. 8 is a front cross-sectional view of the filter element just after the condition shown in FIG. 7.

FIG. 8 is a front cross-sectional view of the filter element 3 just after the condition shown in FIG. 7. The trapped object remover 34 is moved away from the second end member 33, so that a certain space is created therebetween. The pressure in the space is higher than in the region below the trapped object remover 34. However, the pressure in the space is lower than in the filtered fluid chamber 10, which surrounds the space, because the rate of the fluid flow from other filter elements 3, which are filtering the fluid, into the communication chamber 13 is restricted by the gaps 39 of these filter elements 3, and, additionally, the rate of the fluid flow from the communication chamber 13 into the filter element 3 shown in FIG. 8 is restricted by the openings 37 of the filter element 3 shown in FIG. 8. Accordingly, the fluid in the filtered fluid chamber 10 flows also into the space, and then pushes down the trapped object remover 34 until the trapped object remover 34 abuts on the first end member 32 side at the lower end of the filter member 31. Thereby, the trapped object remover 34 scrapes away the trapped objects from the inner periphery of the filter member 31. Then, these objects together with the backflushing fluid are introduced into the backwashing pipe 5, and discharged out.

Note that, when the trapped object remover 34 abuts on the stopper 38b on the first end member 32 side at the lower end of the filter member 31, the outer peripheral part (such as bristles 34b) of the trapped object remover 34 is downwardly flexed by the fluid flow. As a result, a gap is created between the trapped object remover 34 and the filter member 31, and allows the fluid to flow therethrough into the backwashing pipe 5.

Figure 9:
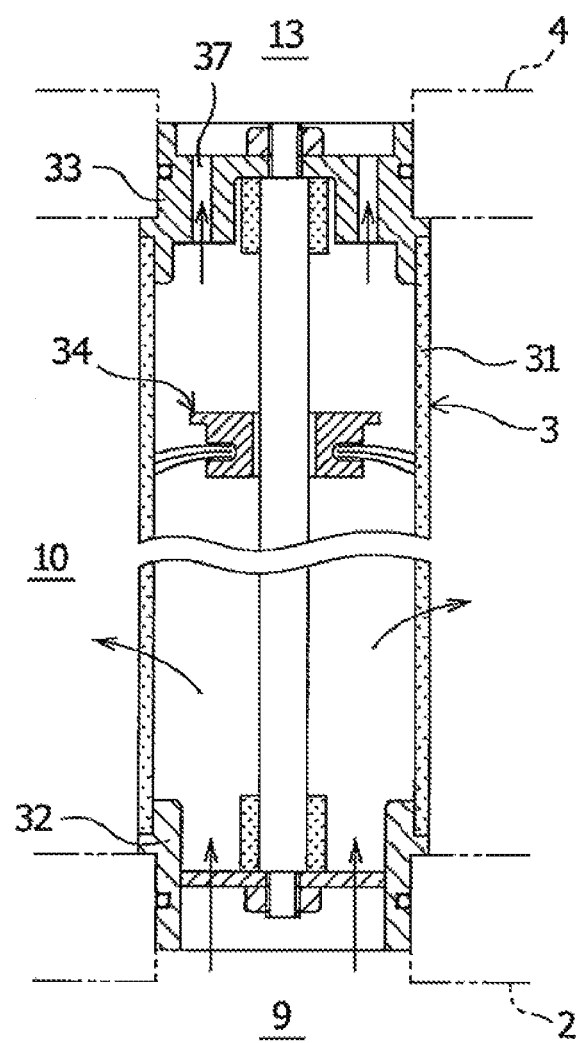
FIG. 9 is a front cross-sectional view of the filter element for which backwashing has just finished and into which the fluid in the unfiltered fluid chamber starts flowing.

FIG. 9 is a front cross-sectional view of the filter element 3 when the backwashing pipe 5 has rotated further and is now connected to another unillustrated one of the filter elements 3 that is next to the filter element 3 shown in FIG. 9. Since the filter element 3 shown in FIG. 9 is now disconnected from the backwashing pipe 5, the fluid in the unfiltered fluid chamber 9 resumes flowing into this filter element 3. Thereby, the fluid is filtered by passing through the filter member 31 from the inside to the outside to enter the filtered fluid chamber 10, and, at the same time, this upward unfiltered fluid flow moves the trapped object remover 34 upwardly. If the upper end of each of the filter elements 3 is completely closed, and the trapped object remover 34 moves closer to this closed end, the fluid trapped therebetween could not easily escape, thus would sometimes prevent the trapped object remover 34 from being moved up sufficiently. In fact, however, the second end member 33 of each of the filter elements 3 according to the present invention has the openings 37. Accordingly, the fluid above the trapped object remover 34 of the filter element 3 shown in FIG. 9 can flows out through the openings 37 and the communication chamber 13 into another one of the filter elements 3 that is now being backwashed. This allows the trapped object remover 34 to smoothly move up to its uppermost position.

In particular, in this embodiment, the mounting member 34a of the trapped object remover 34 restricts the fluid flow channels through the openings 37 when moved to stay at the abutment position on the second end member 33 side. In other words, the restriction on the flow rate through the second end member 33 stays relaxed unless the trapped object remover 34 comes closest to the second end member 33. Accordingly, even when the filtering and backwashing operations are frequently and alternately repeated in each of the filter elements 3 while the filtering apparatus performs backwashing, the corresponding trapped object remover 34 can reliably move up to its uppermost position.

Figure 10:
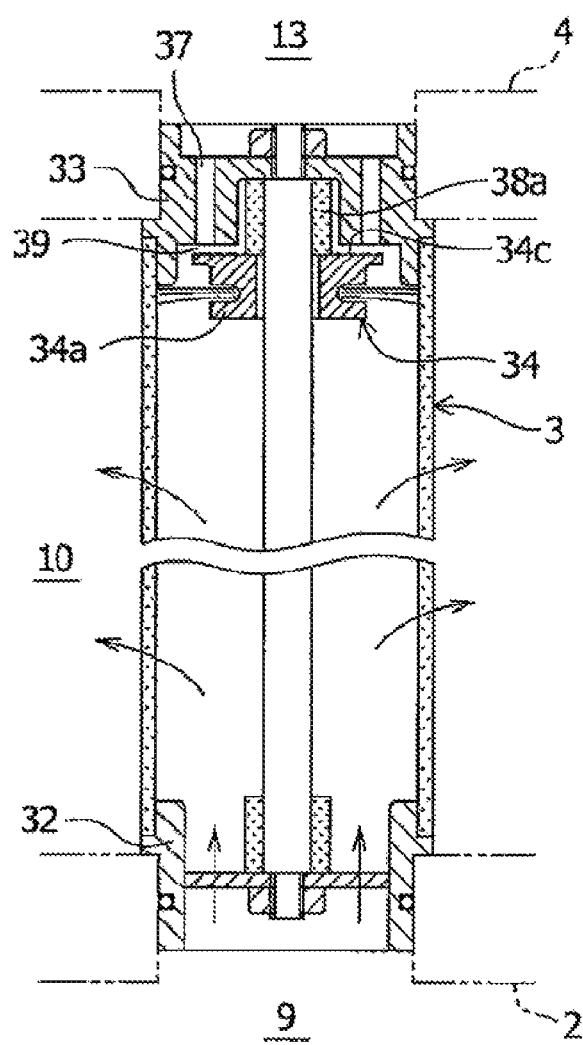
FIG. 10 is a front cross-sectional view of the filter element 3 in which the trapped object remover reaches its uppermost portion after the condition shown in FIG. 9.

FIG. 10 is a front cross-sectional view of the filter element 3 after the condition shown in FIG. 9, in which the trapped object remover 34 reaches its uppermost portion. The condition shown in FIG. 10 is similar to that in FIG. 5 except that another filter element 3, which communicates with the filter element 3 of FIG. 10 through the communication chamber 13, is being backwashed and thus has a low pressure. Accordingly, the pressure of the communication chamber 13 is also reduced, thus allowing the fluid in the filter element 3 of FIG. 10 to flow out into the communication chamber 13 at a higher rate than under the condition shown in FIG. 5. However, in this embodiment, the mounting member 34a of the trapped object remover 34 restricts the fluid flow channels through the openings 37 while staying at the abutment position on the second end member 33 side, as shown in FIG. 10. Thus, it is possible to prevent the fluid in the filter element 3 of FIG. 10 from flowing at an excessively high flow rate through the communication chamber 13 into another filter element 3 that is being backwashed, and causing a reduction in reverse pressure difference between inside and outside of the filter member 31 to decrease the backwashing efficiency. In other words, this configuration restricts flow of fluid into the communication chamber 13 from the filter element 3 in the condition of FIG. 10, while the configuration allows flow of fluid into the communication chamber 13 from the filter element 3 shown in FIG. 9 in which the trapped object remover 34 is moving up. This allows the trapped object remover 34 to move up sufficiently without reducing the effect of backwashing.

Thereafter, the backwashing pipe 5 is rotated to be connected to the filter elements 3 one after another. Thereby, each of the trapped object removers 34 can reliably scrape away the trapped objects as moved up and down in the corresponding filter element 3 as shown in FIGS. 7 to 10.

The opening area of the openings 37 and the size of the abutment gap 39 are set as follows. Specifically, the wider the abutment gap 39 is, the greater flow rate of the fluid is allowed to enter the communication chamber 13 from the filter elements 3 that are filtering the fluid supplied from the unfiltered fluid chamber 9, and thus the greater flow rate of the fluid is allowed to enter the filter element 3 that is connected to the backwashing pipe 5. This means that the wider gap 39 makes it easier to achieve the advantages a) and c) in [0041], but makes it more difficult to achieve the advantage d). Therefore, the size of the abutment gap 39 should be set to a value which has been proved to be optimal for achieving the advantages a), c) and d) through experiments and the like.

Meanwhile, the larger opening area of the openings 37 allows the greater rate of the fluid in the filter element 3 to flow out into the communication chamber 13 while the trapped object remover 34 is away from the abutment position on the second end member 33 side. This means that larger opening area of the openings 37 makes it easier to achieve the advantage b). On the other hand, while the filtering apparatus performs backwashing, in any of the filter elements 3 not connected to the backwashing pipe 5, if, for some reason, the corresponding trapped object remover 34 is unable to reach the abutment position on the second end member 33 side, the openings 37 alone will not be able to sufficiently restrict the flow rate into the communication chamber 13. In addition, the openings 37 with a large opening area will not be able to sufficiently restrict the flow rate from the communication chamber 13 into the filter element 3 that is being backwashed. This means that the large opening area of the openings 37 makes it more difficult to achieve the advantage d). Therefore, the opening area of the openings 37 should be set as small as possible so long as the advantage b) can be achieved.

To achieve the advantage d), it is desirable to adjust the size of the gap 39 and the opening area of the openings 37 of each of the filter elements 3 so that the flow rate from the communication chamber 13 into the filter element 3 that is being backwashed becomes 5 to 20% of the flow rate of fluid passing from the filtered fluid chamber 10 into this filter element 3 through the corresponding filter member 31.

Next, a second embodiment of each of the filter elements 3 according to the present invention will be described.

Figure 11A:
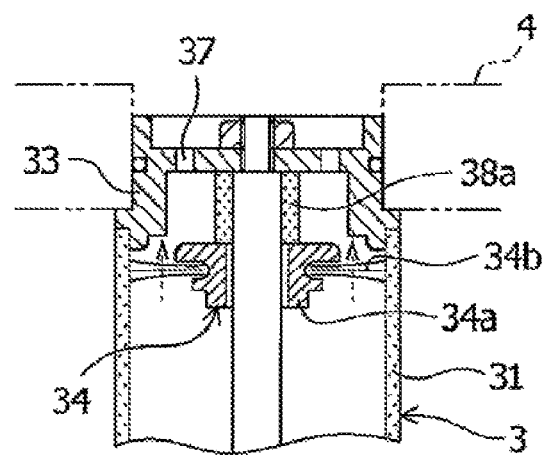
FIGS. 11A and 11B are cross-sectional views of substantial parts of a second embodiment of the filter element according to the present invention, which respectively show an upper end portion during filtration and a lower end portion during backwashing.
Figure 11B:
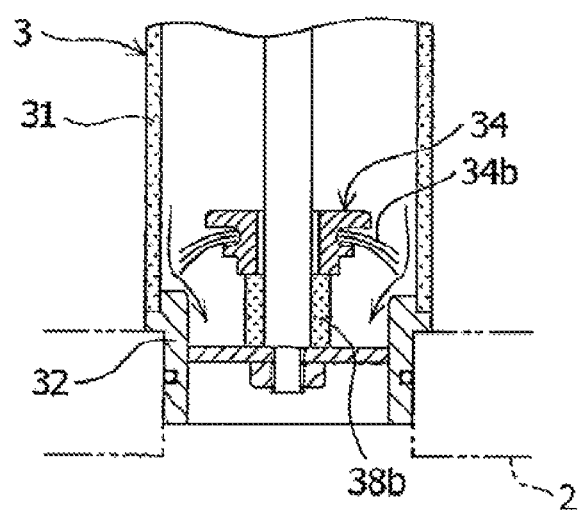

FIGS. 11A and 11B are each a front cross-sectional view of the second embodiment of the filter element 3 according to the present invention. The second embodiment is different from the first embodiment in that the openings 37 formed in the second end member 33 together with the bristles 34b of the removal brush 34 constitute the flow rate restricting means, and that when the removal brush 34 is at the abutment position on the second end member 33 side, the bristles 34b restrict the fluid flow channels through the openings 37. Specifically, a removal brush is used as the trapped object remover 34. Meanwhile, the second end member 33 has the openings 37. When the removal brush 34 abuts on the stopper 38a on the second end member 33 side, since no gap is left between the bristles 34b of the removal brush 34 and the inner periphery of the filter member 31, the bristles 34b fill the space between the outer periphery of the brush main body 34a and the inner periphery of the filter member 31. In this configuration, the fluid has to flow through the spaces between the bristles 34b before flowing through the openings 37. In other words, the bristles 34b of the removal brush 34 restrict the flow rate through the second end member 33. Note that, when the removal brush 34 abuts on the stopper 38b on the first end member 32 side, the bristles 34b are flexed sufficiently to create a gap between the bristles 34b and the inner periphery of the filter member 31, and allows the fluid to flow through the gap as shown in FIG. 11B.

The operation of the filter element 3 according to the second embodiment, which is configured as above, is basically the same as that according to the first embodiment. While the second end member 33 is at the abutment position on the openings 37 side, the flow rate through the openings 37 depends on the conditions such as the density and the flexibility of the bristles 34b and the distance between the outer periphery of the brush main body 34a and the inner periphery of the filter member 31. Accordingly, these conditions are set so as to achieve the advantages a), c) and d). The opening area of the openings 37 of the second end member 33 is set so as to achieve the advantage b) as in the case of the first embodiment.

Next, a third embodiment of the filter element 3 according to the present invention will be described.

Figure 12:
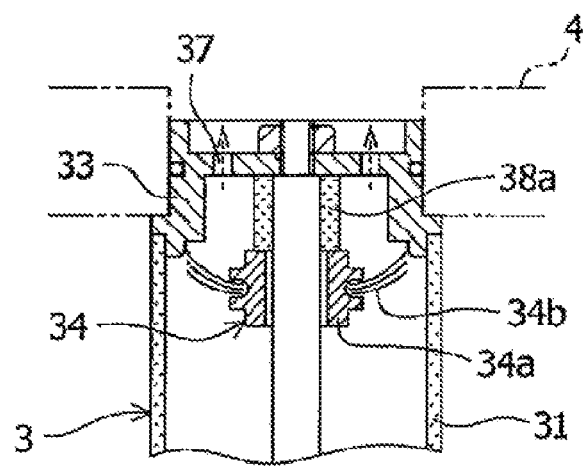
FIG. 12 is a cross-sectional view of a substantial part of a third embodiment of the filter element according to the present invention.

FIG. 12 is a front cross-sectional view of the third embodiment of the filter element 3 according to the present invention. The third embodiment is different from the first and second embodiments in that the openings 37 of the second end member 33 are orifices that constitute the flow rate restricting means. Specifically, the orifices 37 restrict the flow rate through the second end member 33. Even while the trapped object remover 34 abuts on the stopper 38a on the second end member 33 side, the mounting member 34a and the bristles 34b do not restrict the fluid flow channels through the orifices 37 or do restrict these fluid flow channels to an extent smaller than that caused by the orifices 37 themselves. In contrast to the second embodiment, when the trapped object remover 34 is a removal brush, for example, the bristles 34b are flexed sufficiently to create a gap between the bristles 34b and the filter member 31, and thus do not obstruct the fluid flow through the second end member 33 even while staying at the abutment position on the second end member 33 side.

The operation of the filter element 3 according to the third embodiment, which is configured as above, is basically the same as those according to the first and second embodiments. However, the opening area of the orifices 37 is the sole factor restricting the flow rate through the second end member 33 in this embodiment. The opening area of the orifices 37 needs to be set so as to achieve the advantages a) to d).

In the above description, each of the trapped object removers 34 is a removal brush, as an example. However, the present invention is not limited to this. The trapped object remover 34 may be any unit so long as it can be moved in the corresponding filter element 3 in its axial direction by the fluid flow generated during filtration or backwashing, and it has, on the outer periphery, a member capable of sliding in contact with the inner periphery of the filter element 3 and removing trapped objects from the inner periphery. For example, the trapped object remover 34 may alternatively be a blade-shaped or spatula-shaped scraper or the like made of a metal, a resin or rubber.

Next, with reference to FIGS. 13 and 14, the operations of the first embodiment of the filtering apparatus, configured as above, will be described. Since having been described in detail in the above description for the first embodiment of the filter element 3, the behavior of the fluid flow in each of the filter elements 3 and the movements of its trapped object remover 34 during the operations of the filtering apparatus will be described only in outline.

Figure 13:
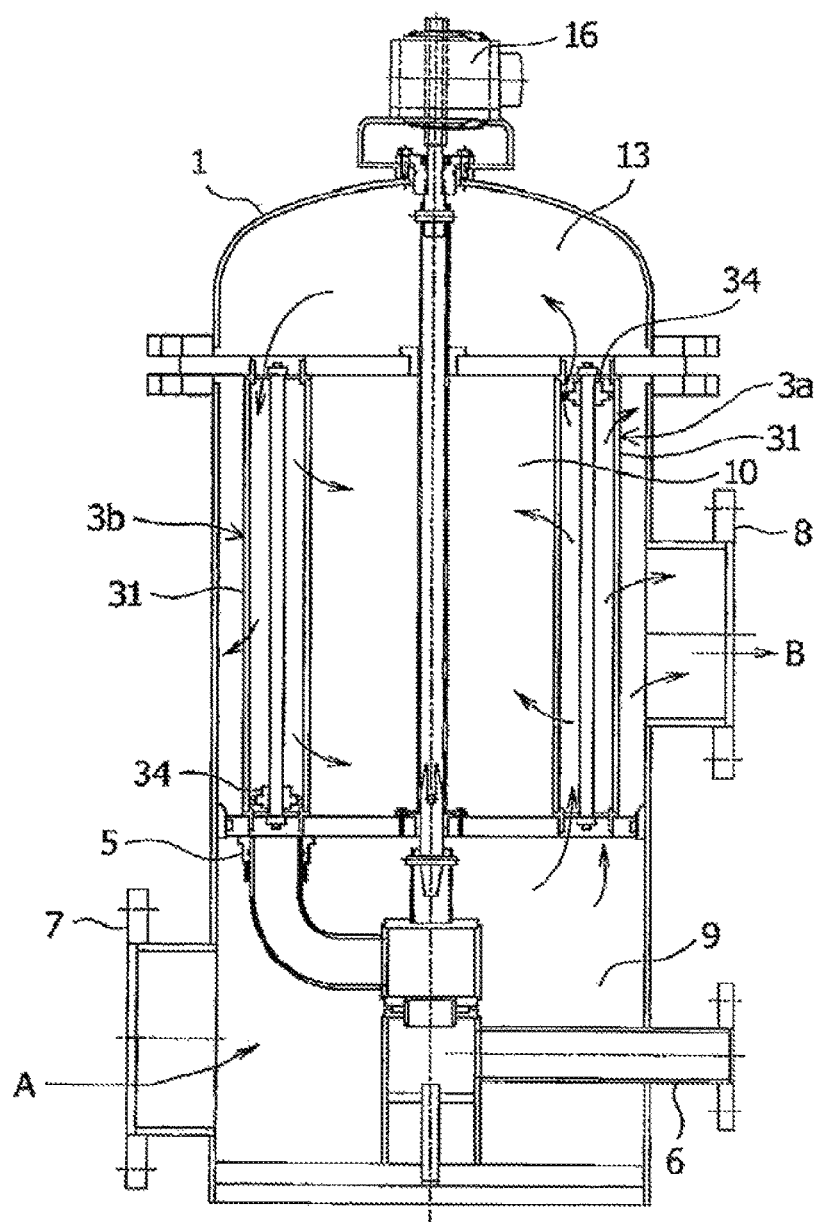
FIG. 13 is a front cross-sectional view of the filtering apparatus that performs filtration.

FIG. 13 is a front cross-sectional view of the filtering apparatus that performs filtration. During filtration, the valve for the backwashing fluid discharge system is closed, sucking by the backwashing pipe 5 is not performed, and the backwashing pipe 5 stops rotating.

First, the fluid to be filtered flows in the unfiltered fluid chamber 9 of the casing 1 through the fluid inlet 7 as indicated by arrow A. The fluid then flows in the filter element 3a that communicates with the unfiltered fluid chamber 9, and filtered by passing through the filter elements 3a from the inside to the outside to enter the filtered fluid chamber 10. The fluid having entered the filtered fluid chamber 10 is introduced to the outside through the fluid outlet 8 as indicated by arrow B. During filtration, the fluid pushes up the trapped object remover 34 in the filter element 3a to its uppermost position. Note that, though the backwashing pipe 5 prevents the fluid in the unfiltered fluid chamber 9 from flowing into the filter element 3b that is connected to the backwashing pipe 5, the fluid in the other filter elements 3 flows into the filter element 3b through the communication chamber 13. Thus, the filter element 3b also filters the fluid while the filtering apparatus performs filtration.

Figure 14:
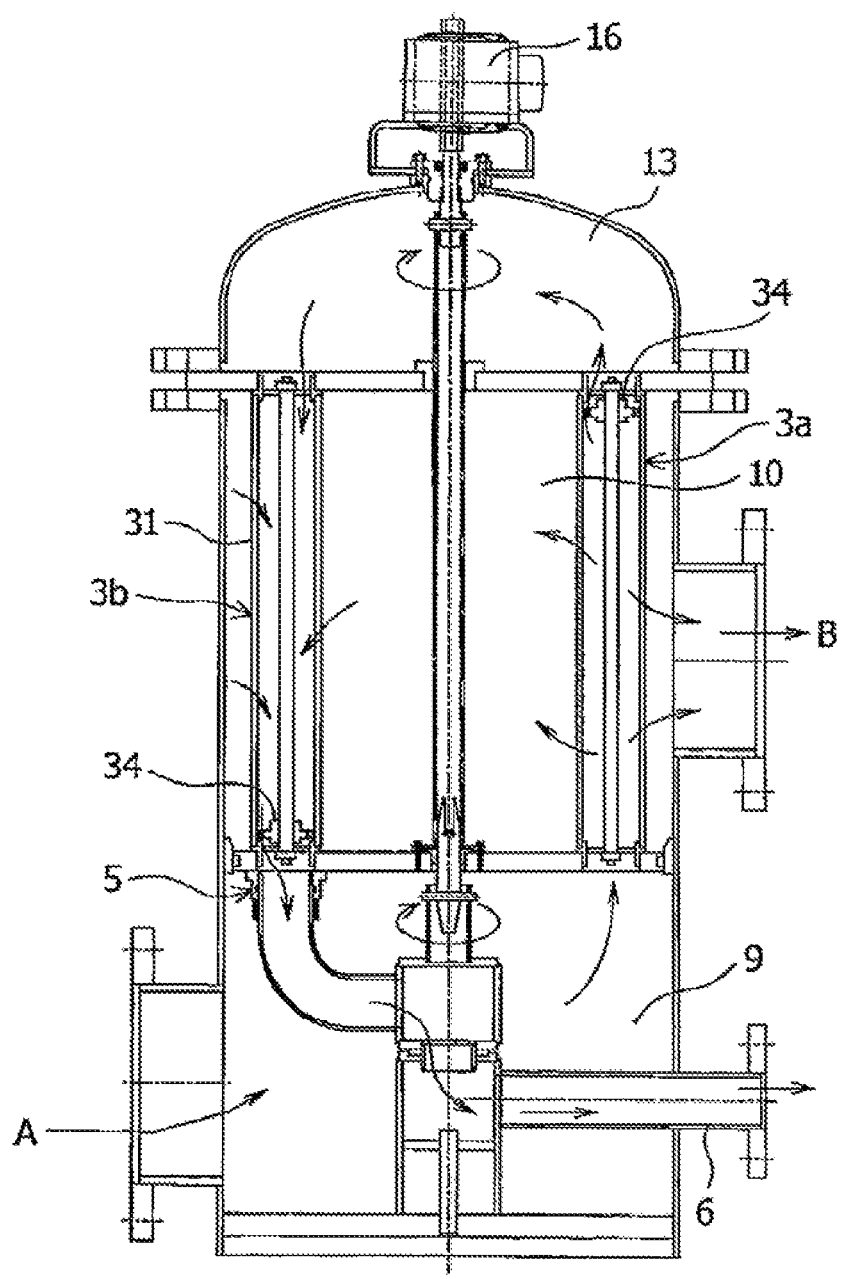
FIG. 14 is a front cross-sectional view of the filtering apparatus that performs backwashing.

FIG. 14 is a front cross-sectional view of the filtering apparatus that performs backwashing. During backwashing, the valve for the backwashing fluid discharge system is opened and the backwashing pipe 5 starts sucking out the fluid. The backwashing pipe 5 is rotated by the geared motor 16 so as to be connected to the filter elements 3 one after another.

When rotated to be connected to the filter element 3b, the backwashing pipe 5 sucks out the fluid in the filter element 3b. This reduces the pressure in this filter element 3b, and thus causes the fluid in the filtered fluid chamber 10, which surrounds the filter element 3b, to pass through to the inside of the filter element 3b in the reverse direction of that for filtration. Thereby, the filter element 3b is backwashed. At the same time, the downward fluid flow in the axial direction of the filter element 3b generated during backwashing moves the trapped object remover 34 in the filter element 3b from its uppermost position to its lowermost position. Thereby, the trapped object remover 34 scrapes away the trapped objects from the inner periphery of the filter member 31. The trapped and removed objects are discharged out together with the backwashing fluid through the backwashing pipe 5 and the backwashing fluid drain pipe 6. In the meanwhile, the fluid in the unfiltered fluid chamber 9 continues to flow into the filter element 3a not connected to the backwashing pipe 5. Accordingly, the filter elements 3a continue to filter the fluid similarly to while the filtering apparatus performs filtration. The fluid having entered the filter element 3a flows through the communication chamber 13 into the filter element 3b that is connected to the backwashing pipe 5. This allows the trapped object remover 34 that is present at its uppermost portion in the filter element 3b to smoothly move down at the start of the backwashing operation for the filter element 3b. Note that the fluid flow from the communication chamber 13 into the filter element 3b is restricted to a low rate by the flow rate restricting means so as not to adversely affect the backwashing efficiency.

In the filter element 3a that has just been disconnected from the backwashing pipe 5, the fluid flow from the unfiltered fluid chamber 9 into the filter element 3a moves the trapped object remover 34 upwardly. At that time, the trapped object remover 34 can smoothly move up to its uppermost position since the fluid above the trapped object remover 34 is allowed to flow out through the communication chamber 13 into another one of the filter elements 3 that is being backwashed. Thereafter, the backwashing pipe 5 is rotated by the geared motor 16 so as to be connected to the filter elements 3 one after another. Thereby, each of the trapped object removers 34 is moved up and down in the corresponding filter element 3 so that the filter elements 3 can be reliably backwashed.

For example, when the filter members for ballast seawater are used, filtration and backwashing are performed under the following conditions. Filtration is performed with, for example, a primary pressure of 3.0 kg and a secondary pressure of 2.8 to 2.9 kg. Every one to ten hours of the filteration operation, backwashing is performed for two minutes at a rotational speed of 1 rpm with the outlet of the backwashing fluid drain pipe 6 opened to atmospheric pressure.

Next the configuration of a second embodiment of the filtering apparatus according to the present invention using the filter elements 3 will be described.

Figure 15:
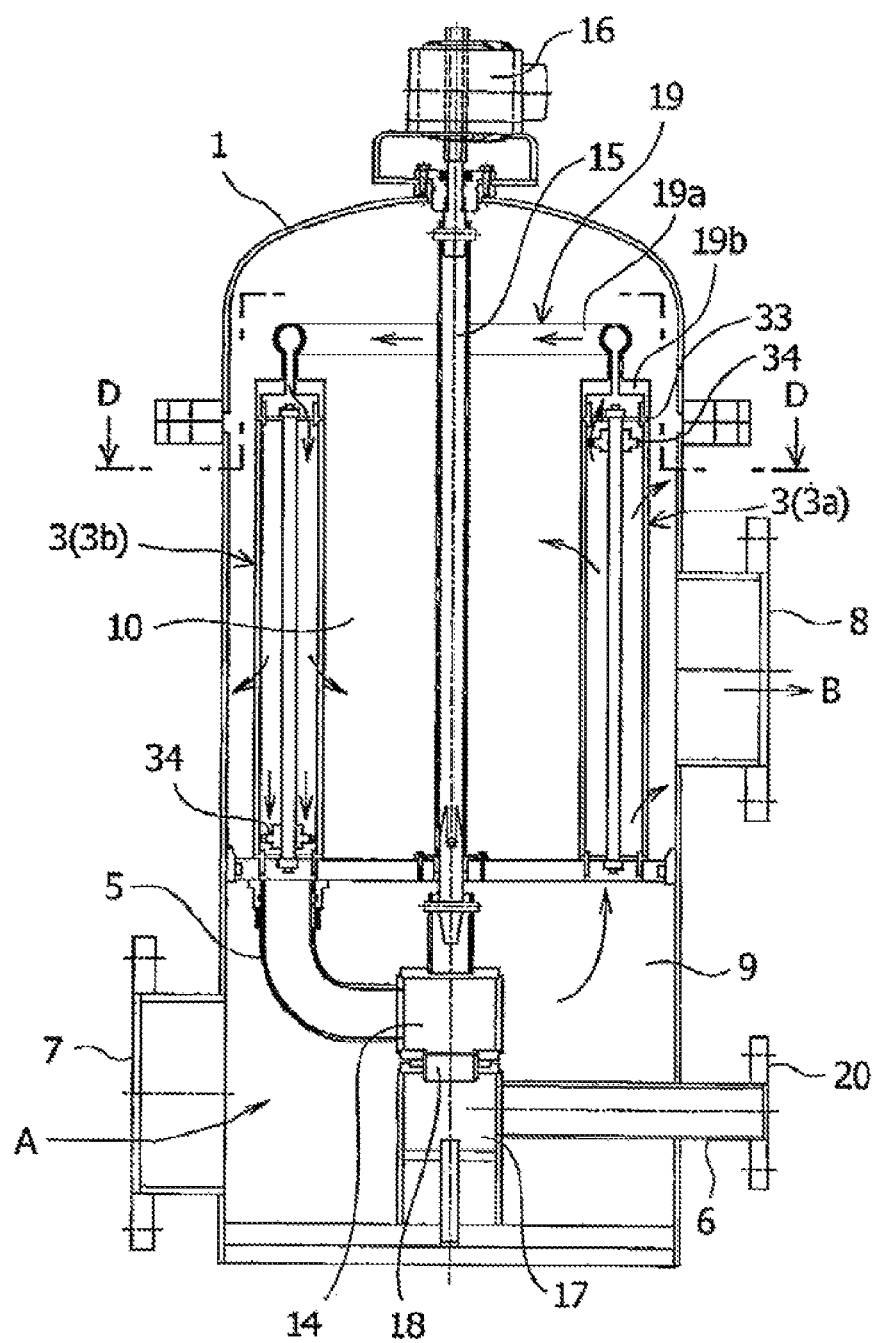
FIG. 15 is a front cross-sectional view of a second embodiment of the filtering apparatus according to the present invention.

FIG. 15 is a front cross-sectional view of the second embodiment of the filtering apparatus according to the present invention. The filtering apparatus according to the second embodiment does not include the second partition wall 4 and the communication chamber 13 defined by the second partition wall 4, which are included in the first embodiment. Instead, the filtering apparatus according to the second embodiment includes a communication pipe 19 connected to the first ends, opposite to the second ends connected to the unfiltered fluid chamber 9, of the filter elements 3 so that they communicate with one another while isolated from the filtered fluid chamber 10.

Figure 16:
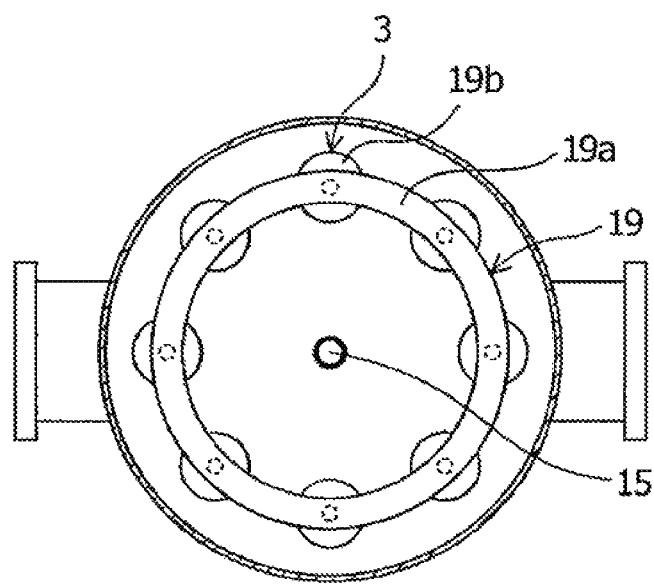
FIG. 16 is a cross-sectional view taken along D-D line of FIG. 15.

The communication pipe 19 allows the fluid to flow therethrough between the filter elements 3 while the fluid is isolated from the surroundings. The communication pipe 19 includes a pipe part 19a and joint parts 19b, which join the pipe part 19a to the second end members 33 of the filter elements 3. In the filtering apparatus according to the present invention, the pipe part 19a has only to connect a filter element 3 that is connected to the backwashing pipe 5 to a filter element 3 that is not connected to the backwashing pipe 5, in principle. Accordingly, the pipe part 19a may have a shape capable of connecting any two of the filter elements 3 at a time. However, from the viewpoint of stable operation, the pipe part 19a should desirably have a shape that simultaneously connects all the filter elements 3 to one another. Specifically, the pipe part 19a may have a ring shape that connects all the filter elements 3 as shown in FIG. 16, for example. The pipe part 19a may be formed of a known pipe material. For example, the pipe part 19a may be formed of a metal such as a stainless steel, natural rubber or a resin such as a polyvinyl chloride resin. The pipe part 19a may be formed of any flexible material so long as the material is strong enough to maintain its shape against any force due to a difference in pressure inside and outside the pipe part 19a. Forming the pipe part 19a of a flexible material allows the pipe part 19a to be mounted or dismounted more efficiently. As the joint parts 19b, any known joint that has a predetermined strength and reliable airtightness may be used.

The operations of the filtering apparatus configured as above are basically similar to those in the first embodiment. Thus, the operations related to the communication pipe 19 will be described below.

During filtration, as shown in FIG. 15, the fluid to be filtered is supplied to the unfiltered fluid chamber 9, and then enters the filter elements 3a that communicate with the unfiltered fluid chamber 9. The fluid is filtered by passing through the filter elements 3a from the inside to the outside to enter the filtered fluid chamber 10, which surrounds the filter elements 3a. Note that, though the backwashing pipe 5 prevents the fluid in the unfiltered fluid chamber 9 from flowing into the filter element 3b that is connected to the backwashing pipe 5, the fluid in another filter element 3a flows through the communication pipe 19 into the filter element 3b. Thus, filtration is performed also in the filter element 3b.

On the other hand, during backwashing, though not illustrated, the valve for the backwashing fluid discharge system is opened and the backwashing pipe 5 sucks out the fluid from the filter element 3b connected to the backwashing pipe 5. This reduces the pressure in this filter element 3b, and thus causes the fluid in the filtered fluid chamber 10, which surrounds the filter element 3b, to pass through to the inside of the filter element 3b in the reverse direction of that for filtration. Thereby, the filter element 3b is backwashed. In the meanwhile, the fluid in the filter element 3a that is not connected to the backwashing pipe 5 flows through the communication pipe 19 into the filter element 3b that is connected to the backwashing pipe 5. This allows the trapped object remover 34, which is present at its uppermost portion in the filter element 3b at the start of the backwashing operation for the filter element 3b, to smoothly move down to remove the trapped objects. Note that the fluid flow to the filter element 3b is restricted to a low rate by the flow rate restricting means so as not to adversely affect the backwashing efficiency. In the filter element 3a whose backwashing has just finished, the trapped object remover 34 is moved upwardly. At that time, the trapped object remover 34 can smoothly move up to its uppermost position since the fluid between the upper end member 33 and the trapped object remover 34 is allowed to flow out through the communication pipe 19 into another filter element 3 that is being backwashed.

The second embodiment has a wide acceptable length range for the filter elements 3 since their length does not depend on the distance between the two partition walls.

REFERENCE SYMBOL LIST 1 casing
2 first partition wall
3, 3a and 3b filter element
4 second partition wall
5 backwashing pipe
6 backwashing fluid drain pipe
7 fluid inlet
8 fluid outlet
9 unfiltered fluid chamber
10 filtered fluid chamber
11 through hole
12 through hole
13 communication chamber
14 base end portion of backwashing pipe
15 shaft
16 geared motor
17 base end portion of backwashing fluid drain pipe
18 coupling port portion
19 communication pipe
19a pipe part
19b joint part
20 discharge port
31 filter member
32 first end member
33 second end member
34 trapped object remover (removal brush)
34a mounting member (brush main body)
34b bristles
34c end face
35 guide shaft
36 stay
37 opening (orifice)
38, 38a, 38b stopper
39 gap

The invention claimed is:

1. A filter element that has a tubular shape with openings at opposite ends in a longitudinal direction thereof, and that is configured to filter fluid by allowing the fluid to pass through the filter element from the inside to the outside, and to be backwashed by allowing the fluid to pass through the filter element from the outside to the inside, the filter element comprising:
a filter member that has a tubular shape extending in a predetermined length;
a first end member which is coupled to a first end of the filter member so as to support the filter member, and which has an opening that allows the fluid to flow therethrough;
a second end member which is coupled to a second end of the filter member so as to support the filter member, and which has an opening that allows the fluid to flow therethrough;
a trapped object remover which is provided in an interior of the filter member, and configured to be movable in the interior of the filter member between the first and second end members by a flow of the fluid in an axial direction of the filter member generated during filtration or backwashing, while an outer periphery of the trapped object remover slides in contact with an inner periphery of the filter member so as to remove an object trapped by the filter member; and
a guide shaft that is disposed on a central axis of the filter member with opposite ends of the guide shaft fixed to the first and second end members,
wherein the trapped object remover has, on the central axis, a through hole through which the guide shaft is inserted so that the trapped object remover is movable in the axial direction of the filter member,
wherein a flow rate restricting arrangement which restricts a flow rate of the fluid through the second end member is provided at the second end of the filter member,
wherein the trapped object remover is a removal brush having a brush main body and bristles planted on an outer periphery of the brush main body,
wherein the opening of the second end member and the bristles of the removal brush constitute the flow rate restricting arrangement,
wherein, when moved to an abutment position on the second end member side, the bristles of the removal brush restrict a flow channel for the fluid through the opening, and
wherein a stopper is mounted on the guide shaft.

2. A filter element that has a tubular shape with openings at opposite ends in a longitudinal direction thereof, and that is configured to filter fluid by allowing the fluid to pass through the filter element from the inside to the outside, and to be backwashed by allowing the fluid to pass through the filter element from the outside to the inside, the filter element comprising:
- a filter member that has a tubular shape extending in a predetermined length;
- a first end member which is coupled to a first end of the filter member so as to support the filter member, and which has an opening that allows the fluid to flow therethrough;
- a second end member which is coupled to a second end of the filter member so as to support the filter member, and which has an opening that allows the fluid to flow therethrough;
- a trapped object remover which is provided in an interior of the filter member, and configured to be movable in the interior of the filter member between the first and second end members by a flow of the fluid in an axial direction of the filter member generated during filtration or backwashing, while an outer periphery of the trapped object remover slides in contact with an inner periphery of the filter member so as to remove an object trapped by the filter member; and
- a guide shaft that is disposed on a central axis of the filter member with opposite ends of the guide shaft fixed to the first and second end members,
- wherein the trapped object remover has, on the central axis, a through hole through which the guide shaft is inserted so that the trapped object remover is movable in the axial direction of the filter member,
- wherein a flow rate restricting arrangement which restricts a flow rate of the fluid through the second end member is provided at the second end of the filter member,
- wherein the opening of the second end member and a mounting member of the trapped object remover constitute the flow rate restricting arrangement,
- wherein, when moved to an abutment position on the second end member side, the mounting member of the trapped object remover restricts a flow channel for the fluid through the opening, and
- wherein a stopper is mounted on the guide shaft.

3. The filter element according to claim 1, wherein the filter member is a metal mesh filter including an innermost layer and one or more outer layers that are integrated by sintering.

4. A filtering apparatus comprising:
- a casing having a fluid inlet that allows fluid to flow in from an outside of the casing, and a fluid outlet that allows the fluid filtered in the filtering apparatus to flow to the outside;
- a first partition wall that separates an interior of the casing into an unfiltered fluid chamber filled with unfiltered fluid and communicating with the fluid inlet and a filtered fluid chamber filled with a filtered fluid and communicating with the fluid outlet;
- a plurality of filter elements which are each formed into a tubular shape, and provided in parallel to each other in the filtered fluid chamber with first ends fitted and held by through holes formed in the first partition wall and with internal spaces of the filter elements communicating with the unfiltered fluid chamber, and each of which is configured to filter the fluid by allowing the fluid to pass through the filter element from the inside to the outside, and to be backwashed by allowing the fluid to pass through the filter element from the outside to the inside;
- a second partition wall that is provided in parallel to the first partition wall so as to be located on a second end side of the filter elements and has a plurality of through holes each for fitting and holding the second end of the corresponding one of the filter elements thus to isolate a portion of the filtered fluid chamber on the second end side of the filter elements from the rest of the filtered fluid chamber to define a communication chamber through which the fluid can flow between the filter elements,
- a backwashing pipe that is connected to the first ends of one or more of the plurality of filter elements to backwash the filter elements by allowing the fluid to pass through the filter elements from the outside to the inside; and
- a backwashing fluid drain pipe that is coupled to a discharge side of the backwashing pipe and discharges, to the outside of the casing, a trapped object removed by backwashing the filter elements,
- wherein each of the filter elements is the filter element according to claim 1, and is disposed so that the first and second end members are located on the first and second end sides of the filter element, respectively.

5. A filtering apparatus comprising:
- a casing having a fluid inlet that allows fluid to flow in from an outside of the casing, and a fluid outlet that allows the fluid filtered in the filtering apparatus to flow to the outside;
- a first partition wall that separates an interior of the casing into an unfiltered fluid chamber filled with unfiltered fluid and communicating with the fluid inlet and a filtered fluid chamber filled with a filtered fluid and communicating with the fluid outlet;
- a plurality of filter elements which are each formed into a tubular shape, and provided in parallel to each other in the filtered fluid chamber with first ends fitted and held by through holes formed in the first partition wall and with internal spaces of the filter elements communicating with the unfiltered fluid chamber, and each of which is configured to filter the fluid by allowing the fluid to pass through the filter element from the inside to the outside, and to be backwashed by allowing the fluid to pass through the filter element from the outside to the inside;
- a communication pipe connected to second ends of the filter elements so that the second ends communicate with one another while isolated from the filtered fluid chamber;
- a backwashing pipe that is connected to the first ends of one or more of the plurality of filter elements to backwash the filter elements by allowing the fluid to pass through the filter elements from the outside to the inside; and
- a backwashing fluid drain pipe that is coupled to a discharge side of the backwashing pipe and discharges, to the outside of the casing, a trapped object removed by backwashing the filter elements,
- wherein each of the filter elements is the filter element according to claim 1, and is disposed so that the first and second end members are located on the first and second end sides of the filter element, respectively.

6. The filter element according to claim 2, wherein the filter member is a metal mesh filter including an innermost layer and one or more outer layers that are integrated by sintering.

7. A filtering apparatus comprising:
a casing having a fluid inlet that allows fluid to flow in from an outside of the casing, and a fluid outlet that allows the fluid filtered in the filtering apparatus to flow to the outside;
a first partition wall that separates an interior of the casing into an unfiltered fluid chamber filled with unfiltered fluid and communicating with the fluid inlet and a filtered fluid chamber filled with a filtered fluid and communicating with the fluid outlet;
a plurality of filter elements which are each formed into a tubular shape, and provided in parallel to each other in the filtered fluid chamber with first ends fitted and held by through holes formed in the first partition wall and with internal spaces of the filter elements communicating with the unfiltered fluid chamber, and each of which is configured to filter the fluid by allowing the fluid to pass through the filter element from the inside to the outside, and to be backwashed by allowing the fluid to pass through the filter element from the outside to the inside;
a second partition wall that is provided in parallel to the first partition wall so as to be located on a second end side of the filter elements and has a plurality of through holes each for fitting and holding the second end of the corresponding one of the filter elements thus to isolate a portion of the filtered fluid chamber on the second end side of the filter elements from the rest of the filtered fluid chamber to define a communication chamber through which the fluid can flow between the filter elements,
a backwashing pipe that is connected to the first ends of one or more of the plurality of filter elements to backwash the filter elements by allowing the fluid to pass through the filter elements from the outside to the inside; and
a backwashing fluid drain pipe that is coupled to a discharge side of the backwashing pipe and discharges, to the outside of the casing, a trapped object removed by backwashing the filter elements,
wherein each of the filter elements is the filter element according to claim 2, and is disposed so that the first and second end members are located on the first and second end sides of the filter element, respectively.

8. A filtering apparatus comprising:
a casing having a fluid inlet that allows fluid to flow in from an outside of the casing, and a fluid outlet that allows the fluid filtered in the filtering apparatus to flow to the outside;
a first partition wall that separates an interior of the casing into an unfiltered fluid chamber filled with unfiltered fluid and communicating with the fluid inlet and a filtered fluid chamber filled with a filtered fluid and communicating with the fluid outlet;
a plurality of filter elements which are each formed into a tubular shape, and provided in parallel to each other in the filtered fluid chamber with first ends fitted and held by through holes formed in the first partition wall and with internal spaces of the filter elements communicating with the unfiltered fluid chamber, and each of which is configured to filter the fluid by allowing the fluid to pass through the filter element from the inside to the outside, and to be backwashed by allowing the fluid to pass through the filter element from the outside to the inside;
a second partition wall that is provided in parallel to the first partition wall so as to be located on a second end side of the filter elements and has a plurality of through holes each for fitting and holding the second end of the corresponding one of the filter elements thus to isolate a portion of the filtered fluid chamber on the second end side of the filter elements from the rest of the filtered fluid chamber to define a communication chamber through which the fluid can flow between the filter elements,
a backwashing pipe that is connected to the first ends of one or more of the plurality of filter elements to backwash the filter elements by allowing the fluid to pass through the filter elements from the outside to the inside; and
a backwashing fluid drain pipe that is coupled to a discharge side of the backwashing pipe and discharges, to the outside of the casing, a trapped object removed by backwashing the filter elements,
wherein each of the filter elements is the filter element according to claim 3, and is disposed so that the first and second end members are located on the first and second end sides of the filter element, respectively.

9. A filtering apparatus comprising:
a casing having a fluid inlet that allows fluid to flow in from an outside of the casing, and a fluid outlet that allows the fluid filtered in the filtering apparatus to flow to the outside;
a first partition wall that separates an interior of the casing into an unfiltered fluid chamber filled with unfiltered fluid and communicating with the fluid inlet and a filtered fluid chamber filled with a filtered fluid and communicating with the fluid outlet;
a plurality of filter elements which are each formed into a tubular shape, and provided in parallel to each other in the filtered fluid chamber with first ends fitted and held by through holes formed in the first partition wall and with internal spaces of the filter elements communicating with the unfiltered fluid chamber, and each of which is configured to filter the fluid by allowing the fluid to pass through the filter element from the inside to the outside, and to be backwashed by allowing the fluid to pass through the filter element from the outside to the inside;
a communication pipe connected to second ends of the filter elements so that the second ends communicate with one another while isolated from the filtered fluid chamber;
a backwashing pipe that is connected to the first ends of one or more of the plurality of filter elements to backwash the filter elements by allowing the fluid to pass through the filter elements from the outside to the inside; and
a backwashing fluid drain pipe that is coupled to a discharge side of the backwashing pipe and discharges, to the outside of the casing, a trapped object removed by backwashing the filter elements,
wherein each of the filter elements is the filter element according to claim 2, and is disposed so that the first and second end members are located on the first and second end sides of the filter element, respectively.

10. A filtering apparatus comprising:
a casing having a fluid inlet that allows fluid to flow in from an outside of the casing, and a fluid outlet that allows the fluid filtered in the filtering apparatus to flow to the outside;
a first partition wall that separates an interior of the casing into an unfiltered fluid chamber filled with unfiltered fluid and communicating with the fluid inlet and a filtered fluid chamber filled with a filtered fluid and communicating with the fluid outlet;
a plurality of filter elements which are each formed into a tubular shape, and provided in parallel to each other in the filtered fluid chamber with first ends fitted and held by through holes formed in the first partition wall and with internal spaces of the filter elements communicating with the unfiltered fluid chamber, and each of which is configured to filter the fluid by allowing the fluid to pass through the filter element from the inside to the outside, and to be backwashed by allowing the fluid to pass through the filter element from the outside to the inside;
a communication pipe connected to second ends of the filter elements so that the second ends communicate with one another while isolated from the filtered fluid chamber;
a backwashing pipe that is connected to the first ends of one or more of the plurality of filter elements to backwash the filter elements by allowing the fluid to pass through the filter elements from the outside to the inside; and
a backwashing fluid drain pipe that is coupled to a discharge side of the backwashing pipe and discharges, to the outside of the casing, a trapped object removed by backwashing the filter elements,
wherein each of the filter elements is the filter element according to claim 3, and is disposed so that the first and second end members are located on the first and second end sides of the filter element, respectively.

* * * * *